(12) United States Patent
Fujioka et al.

(10) Patent No.: US 7,858,242 B2
(45) Date of Patent: Dec. 28, 2010

(54) ELECTROLYTIC SOLUTION FOR AN ELECTROCHEMICAL CAPACITOR AND AN ELECTROCHEMICAL CAPACITOR USING THE SAME

(75) Inventors: Koji Fujioka, Kyoto (JP); Takao Mukai, Kyoto (JP); Yasuyuki Ito, Neyagawa (JP); Hiroyuki Maeshima, Kobe (JP)

(73) Assignees: Sanyo Chemical Industries, Ltd., Kyoto-shi (JP); Panasonic Corporation, Kadoma-shi (JP)

( * ) Notice: Subject to any disclaimer, the term of this patent is extended or adjusted under 35 U.S.C. 154(b) by 0 days.

(21) Appl. No.: 11/340,679

(22) Filed: Jan. 27, 2006

(65) Prior Publication Data

US 2006/0118755 A1 Jun. 8, 2006

(51) Int. Cl.
*H01M 6/16* (2006.01)
(52) U.S. Cl. .................. 429/324; 429/338; 429/340; 429/337; 429/339; 429/342
(58) Field of Classification Search .................. 429/128, 429/209, 218.1, 324, 338, 340, 337, 339, 429/342
See application file for complete search history.

(56) References Cited

U.S. PATENT DOCUMENTS

| 5,870,275 A | 2/1999 | Shiono et al. |
| 5,965,054 A | 10/1999 | McEwen et al. |
| 6,535,373 B1 | 3/2003 | Smith et al. |
| 2002/0036884 A1* | 3/2002 | Shimamoto et al. ......... 361/502 |
| 2002/0110739 A1 | 8/2002 | McEwen et al. |

FOREIGN PATENT DOCUMENTS

| EP | 0684620 A1 | 11/1995 |
| JP | 08-321439 | 12/1996 |
| JP | 11-54375 | 2/1999 |
| JP | 2000-277125 | 10/2000 |
| JP | 2000-285960 | 10/2000 |
| JP | 2000-319284 | 11/2000 |
| JP | 2001-230159 A | 8/2001 |
| JP | 2002-8948 | 1/2002 |
| JP | 2002-334815 | 11/2002 |
| JP | 2003-173934 | 6/2003 |
| JP | 2003-272956 | 9/2003 |
| JP | 2003-324039 | 11/2003 |
| JP | 2003-324039 A | 11/2003 |
| JP | 2004-207451 | 7/2004 |
| JP | 2004-221557 | 8/2004 |
| JP | 2004-319817 | 11/2004 |
| JP | 2005-529232 | 9/2005 |
| WO | WO 03/046257 | 6/2003 |

OTHER PUBLICATIONS

Japanese Office Action dated Dec. 11, 2007 of 2004-345410.
European Search Report dated Jun. 13, 2008, issued in corresponding European Patent Application No. 04029267.

* cited by examiner

*Primary Examiner*—Jane Rhee
(74) *Attorney, Agent, or Firm*—Westerman, Hattori, Daniels & Adrian, LLP

(57) ABSTRACT

There is provided an electrolytic solution which may significantly improve performance deterioration with time of an electrochemical capacitor. There is provided an electrolytic solution, comprising an electrolyte salt (A) shown as the following formula (1). In the formula, "$R^1$," "$R^2$," and "$R^3$" independently represent an alkyl group having a carbon number of 1 to 3, "$R^4$" and "$R^5$" independently represent hydrogen atom or an alkyl group having a carbon number of 1 to 3, and "$X^-$" represents a counterpart anion.

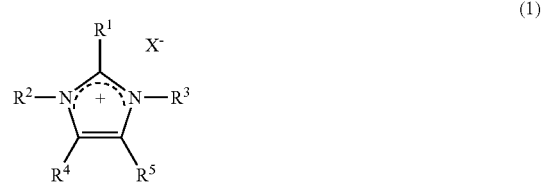

(1)

13 Claims, No Drawings

ELECTROLYTIC SOLUTION FOR AN ELECTROCHEMICAL CAPACITOR AND AN ELECTROCHEMICAL CAPACITOR USING THE SAME

TECHNICAL FIELD

The present invention relates to an electrolytic solution for an electrochemical capacitor and an electrochemical capacitor using the electrolytic solution. In further more detail, the present invention relates to an electrochemical capacitor, which is adapted for memory backup in various electronic devices, and which is adapted for electric power in battery cars necessary for a large amount of currents. Also, the present invention relates to an electrolytic solution preferable for such electrochemical capacitor.

TECHNICAL BACKGROUND

There has been known an electrolytic solution for an electrochemical capacitor, in which a cyclic amidinium salt is dissolved into a solvent of propylene carbonate. See Patent publication No. 1.

[Patent publication No. 1.] International Patent Publication WO95/15572 Booklet

DISCLOSURE OF THE INVENTION

Objectives to be Solved by the Invention

A conventional non-aqueous electrolytic solution may be insufficient in voltage proof, so that the electrochemical capacitor using such a conventional non-aqueous electrolytic solution may be involved in a significant performance deterioration with time.

Namely, the purpose of the present invention is to provide an electrolytic solution which may significantly improve an electrochemical capacitor in its performance deterioration with time.

SUMMARY OF THE INVENTION

The electrolytic solution for the electrochemical capacitor of the present invention is featured as including an electrolyte salt (A) shown as the following formula (1).

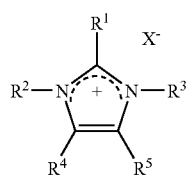

(1)

In the formula, "$R^1$," "$R^2$," and "$R^3$" independently represent an alkyl group having a carbon number of 1 to 3, "$R^4$" and "$R^5$" independently represent hydrogen atom or an alkyl group having a carbon number of 1 to 3, and "$X^-$" represents a counterpart anion.

EFFECT OF THE INVENTION

The electrolytic solution for the electrochemical capacitor of the present invention is significantly high in voltage proof, so that it allows to produce an electrochemical capacitor whose performance deterioration is significantly little. Thus, use of the electrolytic solution of the present invention significantly increases an energy density of the electrochemical capacitor.

BEST MODE OF THE INVENTION

In the formulas (1), (2) and (3), the imidazolium salt of the present invention is named in accordance with a nomenclature generally used in organic chemistry, and the portions in the imidazolium ring are numbered as shown in the formula (4). Thus, the numbers of $R_1$ to $R_5$ do not correspond to the sites of the substituents.

(4)

The electrolyte salt (A) as shown in the formula (1) includes, e.g., the following salt with a cation:

(i) Cations in which "$R^1$," "$R^2$," and "$R^3$" are independently an alkyl group having a carbon number of 1 to 3, and "$R^4$" and "$R^5$" are hydrogen atoms; such as:

1,2,3-trimethyl imidazolium, 1-ethyl-2,3-dimethyl imidazolium, 2-ethyl-1,3-dimethyl imidazolium, 1,2-diethyl-3-methyl imidazolium, 1,3-diethyl-2-methyl imidazolium, 1,2,3-triethyl imidazolium, 1-propyl-2,3-dimethyl imidazolium, and 1-isopropyl-2,3-dimethyl imidazolium.

(ii) Cations in which "$R^1$," "$R^2$," "$R^3$," and "$R^5$" are independently an alkyl group having a carbon number of 1 to 3, and "$R^4$" is hydrogen atom; such as:

1,2,3,4-tetramethyl imidazolium, 1-ethyl-2,3,4-trimethyl imidazolium, 2-ethyl-1,3,4-trimethyl imidazolium, 1,2-diethyl-3,4-dimethyl imidazolium, 1,3-diethyl-2,4-dimethyl imidazolium, 1,2,3-triethyl-4-methyl imidazolium, 1,2,3-trimethyl-4-ethyl imidazolium, 1,4-diethyl-2,3-dimethyl imidazolium, 2,4-diethyl-1,3-dimethyl imidazolium, 1,2,4-triethyl-3-methyl imidazolium, 1,3,4-triethyl-2-methyl imidazolium, 1,2,3,4-tetraethyl imidazolium, 1-propyl-2,3,4-trimethyl imidazolium, and 1-isopropyl-2,3,4-trimethyl imidazolium.

(iii) Cations in which "$R^1$," "$R^2$," "$R^3$," and "$R^4$" are independently an alkyl group having a carbon number of 1 to 3, and "$R^5$" is hydrogen atom; such as:

1-ethyl-2,3,5-trimethyl imidazolium, 1,2-diethyl-3,5-dimethyl imidazolium, 1,5-diethyl-2,3-dimethyl imidazolium, 1,2,5-triethyl-3-methyl imidazolium, 1-propyl-2,3,5-trimethyl imidazolium, and 1-isopropyl-2,3,5-trimethyl imidazolium.

(iv) Cations in which "$R^1$," "$R^2$," "$R^3$," "$R^4$" and "$R^5$" are independently an alkyl group having a carbon number of 1 to 3; such as:

1,2,3,4,5-pentamethyl imidazolium, 1-ethyl-2,3,4,5-tetramethyl imidazolium, 2-ethyl-1,3,4,5-tetramethyl imidazolium, 3-ethyl-1,2,4,5-tetramethyl imidazolium, 4-ethyl-1,2,3,5-tetramethyl imidazolium, 1,2,3,4,5-pentaethyl imidazolium, 1-propyl-2,3,4,5-tetramethyl imidazolium, and 1-isopropyl-2,3,4,5-tetramethyl imidazolium.

Among the cations as listed, it would be preferable, in view of voltage proof and solubility, to use (i) the cations in which "$R^1$," "$R^2$," and "$R^3$" are independently an alkyl group having a carbon number of 1 to 3, and "$R^4$" and "$R^5$" are hydrogen atoms; (ii) the cations in which "$R^1$," "$R^2$," "$R^3$," and "$R^5$" are independently an alkyl group having a carbon number of 1 to 3, and "$R^4$" is hydrogen atom; and (iii) the cations in which "$R^1$," "$R^2$," "$R^3$," and "$R^4$" are independently an alkyl group having a carbon number of 1 to 3, and "$R^5$" is hydrogen atom. Further, it would be preferable to use the cations of (i) and (ii). Furthermore, among the cations (i) and (ii), it would be specifically preferable to use ones having methyl group at the second portion, and it would be more preferable to use 1,2,3-trimethyl imidazolium, 1,2,3,4-tetramethyl imidazolium and 1-ethyl-2,3-dimethyl imidazolium. In particular, it would be more preferable to use 1,2,3-trimethyl imidazolium, 1-ethyl 2,3-dimethyl imidazolium. In more particular, it would be most preferable to use 1-ethyl 2,3-dimethyl imidazolium.

As the counterpart anion ($X^-$), it is preferable to use an anion of $PF_6^-$, $BF_4^-$, $AsF_6^-$, $SbF_6^-$, $N(RfSO_3)_2^-$, $C(RfSO_3)_3^-$, $RfSO_3^-$ (where "Rf" represents a fluoroalkyl group having a carbon number of 1 to 12), $F^-$, $ClO_4^-$, $AlF_4^-$, $AlCl_4^-$, $TaF_6^-$, $NbF_6^-$, $SiF_6^-$, $CN^-$ or $F(HF)_n^-$, wherein "n" represents a number from 1 to 4. In view of voltage proof, it is more preferable to use an anion of $PF_6^-$, $BF_4^-$, or $N(RfSO_3)_2^-$. In particular, it is more preferable to use an anion of $PF_6^-$ or $BF_4^-$. It is most preferable to use an anion of $BF_4^-$. It would be noted that "Rf" in the anions of $N(RSO_3)_2^-$, $C(RfSO_3)_3^-$, and $RfSO_3^-$ represents a fluoroalkyl group having a carbon number of 1 to 12, which may include, e.g., trifluoro methyl, pentafluoro ethyl, heptafluoro propyl, and nonafluoro buthyl. Among them, it is preferable to use trifluoro methyl, pentafluoro ethyl, and heptafluoro propyl. It is more preferable to use trifluoro methyl and pentafluoro ethyl. It is most preferable to use trifluoro methyl.

The electrolyte salt (A) is generally obtained by a reaction for quaternary of a tertiary cyclic amidine with a carbonic ester, such as dialkyl carbonate, followed by subjecting the resultant carbonic ester salt to a salt exchange into the counterpart anion ($X^-$). Since carbon dioxide is generated (mixed) in the reaction system in the process of the reaction for quaternary, the cyclic amidinium salt is reacted with carbon dioxide, to obtain by-products of a imidazolium salt (B1) shown as the following formula (2), and a imidazolium salt (B2) shown as the formula (3). Therefore, the electrolyte salt (A) may include the imidazolium salts (B1) and (B2) as impurities. These impurities would affect the voltage proof, resulting in correlating the performance deterioration with time of the electrochemical capacitor, and thus, those contents would be as little as possible. Preferable examples of the electrolyte salt (A) include 1,2,3-trimethyl imidazolium $BF_4^-$ salt, 1,2,3,4-tetramethyl imidazolium $BF_4^-$ salt, 1-ethyl-2,3-dimethyl imidazolium $BF_4^-$ salt, 1,2,3-trimethyl imidazolium $PF_6^-$ salt, 1,2,3,4-tetramethyl imidazolium $PF_6^-$ salt, and 1-ethyl-2,3-dimethyl imidazolium $PF_6^-$ salt.

(Formula 2)

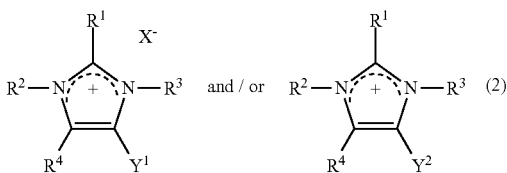

In the formula, "$R^1$," "$R^2$," "$R^3$," "$R^4$," and "$X^-$" represent in the same manner as the formula (1), "$Y^1$" represents carboxyl group ($—CO_2H$) or carboxyoxy group ($—OCO_2H$), and "$Y^2$" represents carboxylate group ($—CO_2^-$) or carboxylate oxy group ($—OCO_2^-$).

(Formula 3)

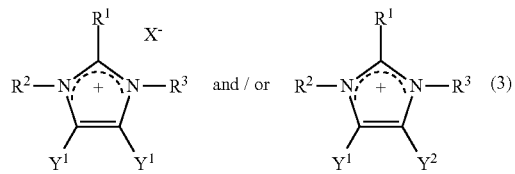

In the formula, "$R^1$," "$R^2$," "$R^3$," and "$X^-$" represent in the same manner as the formula (1), "$Y^1$" and "$Y^2$" represent in the same manner as the formula (2).

In would be noted that in the formulas, the imidazolium salts (B1) and (B2) may exist without the counterpart anion "$X^-$," and in case of no counterpart anion "$X^-$," electric charges in the molecule are balanced because of the group "$Y^2$."

The imidazolium salts (B1) and (B2) may include the following compounds:

<With the Counterpart Anion "$X^-$">

(i) Imidazolium Salts (B1)

Salts of the counterpart anions ($X^-$) of 1,2,3-trimethyl-4-carboxy imidazolium, 1-ethyl-2,3-dimethyl-4-carboxy imidazolium, 2-ethyl-1,3-dimethyl-4-carboxy imidazolium, 1,2-diethyl-3-methyl-4-carboxy imidazolium, 1,3-diethyl-2-methyl-4-carboxy imidazolium, 1,2,3-triemethyl-4-carboxy imidazolium, 1-ethyl-2,3-dimethyl-5-carboxy imidazolium, 1,2-diethyl-3-methyl-5-carboxy imidazolium, 1,2,3,4-tetramethyl-5-carboxy imidazolium, 1-ethyl-2,3,4-trimethyl-5-carboxy imidazolium, 2-ethyl-1,3,4-trimethyl-5-carboxy imidazolium, 1,2-diethyl-3,4-dimethyl-5-carboxy imidazolium, 1,3-diethyl-2,4-dimethyl-5-carboxy imidazolium, 1,2,3-triethyl-4-methyl-5-carboxy imidazolium, 1,2,3-trimethyl-4-ethyl-5-carboxy imidazolium, 1,4-diethyl-2,3-dimethyl-5-carboxy imidazolium, 2,4-diethyl-1,3-dimethyl-5-carboxy imidazolium, 1,2,4-triethyl-3-methyl-5-carboxy imidazolium, 1,3,4-triethyl-2-methyl-5-carboxy imidazolium, 1,2,3,4-tetraethyl-5-carboxy imidazolium, 1-ethyl-2,3,5-trimethyl-4-carboxy imidazolium, 1,2-diethyl-3,5-dimethyl-4-carboxy imidazolium, 1,5-diethyl-2,3-dimethyl-4-carboxy imidazolium, 1,2,5-triethyl-3-methyl-4-carboxy imidazolium, 1-propyl-2,3-dimethyl-4-carboxy imidazolium and 1-isopropyl-2,3-dimethyl-4-carboxy imidazolium, and compounds in which the carboxyl group in the above listed compounds are replaced with carboxyoxy group. Among these salts, the imidazolium salts (B1) of the present invention particularly include 1,2,3-trimethyl-4-carboxy imidazolium $BF_4^-$ salt, 1-ethyl-2,3-dimethyl-4-carboxy imidazolium $BF_4^-$ salt, 1-ethyl-2,3-dimethyl-5-carboxy imidazolium $BF_4^-$ salt, 1,2,3,4-tetramethyl-5-carboxy imidazolium $BF_4^-$ salt, 1,2,3-trimethyl-4-carboxy imidazolium $PF_6^-$ salt, 1-ethyl-2,3-dimethyl-4-carboxy imidazolium $PF_6^-$ salt, 1-ethyl-2,3-dimethyl-5-carboxy imidazolium $PF_6^-$ salt and 1,2,3,4-tetramethyl-5-carboxy imidazolium $PF_6^-$ salt, and compounds in which the carboxyl group in the above listed compounds are replaced with carboxyoxy group.

(ii) Imidazolium Salts (B2)

Salts of the counterpart anions ($X^-$) of 1,2,3-trimethyl-4,5-dicarboxy imidazolium, 1-ethyl-2,3-dimethyl-4,5-dicarboxy imidazolium, 2-ethyl-1,3-dimethyl-4,5-dicarboxy imidazolium, 1,2-diethyl-3-methyl-4,5-dicarboxy imidazolium, 1,3-diethyl-2-methyl-4,5-dicarboxy imidazolium, 1,2,3-triethyl-4,5-dicarboxy imidazolium, 1-propyl-2,3-dimethyl-4,5-dicarboxy imidazolium and 1-isopropyl-2,3-dimethyl-4,5-dicarboxy imidazolium, and compounds in which the carboxyl group in the above listed compounds is replaced with carboxyoxy group. Among these salts, the imidazolium salts (B2) of the present invention particularly include 1,2,3-trimethyl-4,5-dicarboxy imidazolium $BF_4^-$ salt, 1-ethyl-2,3-dimethyl-4,5-dicarboxy imidazolium $BF_4^-$ salt, 1,2,3-trimethyl-4,5-dicarboxy imidazolium $PF_6^-$ salt and 1-ethyl-2,3-dimethyl-4,5-dicarboxy imidazolium $PF_6^-$ salt, and compounds in which the carboxyl group in the above listed compounds are replaced with carboxyoxy group.

<Without the Counterpart Anion "$X^-$">

(i) Imidazolium Salts (B1)

1,2,3-trimethyl-4-carboxylate imidazolium, 1-ethyl-2,3-dimethyl-4-carboxylate imidazolium, 2-ethyl-1,3-dimethyl-4-carboxylate imidazolium, 1,2-diethyl-3-methyl-4-carboxylate imidazolium, 1,3-diethyl-2-methyl-4-carboxylate imidazolium, 1,2,3-triethyl-4-carboxylate imidazolium, 1-ethyl-2,3-dimethyl-5-carboxylate imidazolium, 1,2-diethyl-3-methyl-5-carboxylate imidazolium, 1,2,3,4-tetramethyl-5-carboxylate imidazolium, 1-ethyl-2,3,4-trimethyl-5-carboxylate imidazolium, 2-ethyl-1,3,4-trimethyl-5-carboxylate imidazolium, 1,2-diethyl-3,4-dimethyl-5-carboxylate imidazolium, 1,3-diethyl-2,4-dimethyl-5-carboxylate imidazolium, 1,2,3-triethyl-4-methyl-5-carboxylate imidazolium, 1,2,3-trimethyl-4-ethyl-5-carboxylate imidazolium, 1,4-diethyl-2,3-dimethyl-5-carboxylate imidazolium, 2,4-diethyl-1,3-dimethyl-5-carboxylate imidazolium, 1,2,4-triethyl-3-methyl-5-carboxylate imidazolium, 1,3,4-triethyl-2-methyl-5-carboxylate imidazolium, 1,2,3,4-tetraethyl-5-carboxylate imidazolium, 1-ethyl-2,3,5-trimethyl-4-carboxylate imidazolium, 1,2-diethyl-3,5-dimethyl-4-carboxylate imidazolium, 1,5-diethyl-2,3-dimethyl-4-carboxylate imidazolium, 1,2,5-triethyl-3-methyl-4-carboxylate imidazolium, 1-propyl-2,3-dimethyl-4-carboxylate imidazolium and 1-isopropyl-2,3-dimethyl-4-carboxylate imidazolium, and the compounds in which the carboxylate group in the above listed compounds is replaced with carboxylate oxy group.

(ii) Imidazolium Salts (B2)

1,2,3-trimethyl-4-carboxy-5-carboxylate imidazolium, 1-ethyl-2,3-dimethyl-4-carboxy-5-carboxylate imidazolium, 1-ethyl-2,3-dimethyl-4-carboxylate-5-carboxy imidazolium, 2-ethyl-1,3-dimethyl-4-carboxy-5-carboxylate imidazolium, 1,2-diethyl-3-methyl-4-carboxy-5-carboxylate imidazolium, 1,2-diethyl-3-methyl-4-carboxylate-5-carboxy imidazolium, 1,3-diethyl-2-methyl-4-carboxy-5-carboxylate imidazolium, 1,2,3-triethyl-4-carboxy-5-carboxylate imidazolium, 1-ethyl-2,3-dimethyl-4-carboxy-5-carboxylate imidazolium, 1-propyl-2,3-dimethyl-4-carboxy-5-carboxylate imidazolium and 1-isopropyl-2,3-dimethyl-4-carboxy-5-carboxylate imidazolium, as well as the compounds in which the carboxyl group in the above listed compounds is replaced with carboxyoxy group and the compounds in which the carboxylate group in the above listed compounds is replaced with carboxylate oxy group.

The content of the imidazolium salts (B1) and (B2) is preferably included as little as possible. In view of significant improvement of the voltage proof, it is preferable that these compounds are totally included at an amount of 10 mole % or less based on total molar numbers of the electrolyte salt (A), the imidazolium salt (B1) and the imidazolium salt (B2). Also, it is more preferable that these compounds are included at an amount of 2 mole % or less, and in more particular at an amount of 1 mole % less, and in most particular, of 0.1 mole % or less. Within the range, the voltage proof are further improved, resulting in further improving the performance deterioration with time of the electrochemical capacitor.

The content of the imidazolium salts (B1) and (B2) is quantitatively measured by means of a high performance liquid chromatography (HPLC). The HPLC may be operated in the condition of a column: a polymer coated filler; a mobile phase: a phosphoric acid buffering agent liquid (having a pH value of 2 to 3); a flow rate: 0.8 ml/min.; a detector: UV; and a temperature: 40° C. (For example, equipment: Type LC-10A made by Shimazdu Corporation; a column: CAPCELL PAK $UG120C_{18}$ (4.6 mm in diameter and 25 cm in length) made by Shiseido Corporation; a mobile phase: an aqueous solution of phosphoric acid having a concentration of 10 mmol/l and sodium perchlorate having a concentration of 100 mmol/l; a flow rate: 0.8 ml/min.; a detector: UV (210 nm); an injection volume: 20 µl; and a temperature of the column: 40° C. can be used.) The calibration curve can be prepared with separation of the imidazolium salts (B1) and (B2), which are made as by-products in preparation of the electrolyte salt (A), by means of a separation HPLC (whose conditions are the same as the HPLC), or the electrolyte salt (A) may be combined with carbon dioxide in an autoclave. (Henkel & Cie: D.A.S 1033667 (1958))

It would be noted that the chemical structures of the imidazolium salts (B1) and (B2) may be identified by means of a general organic chemical measurement. For example, they may be identified by means of $^1$H-NMR (e.g., Device: AVANCE300 (manufactured by Nihon Bruker Corporation); solvent: deuterated dimethylsulfoxide; and frequency: 300 MHz); $^{19}$F-NMR (e.g., device: XL-300 (manufactured by Varian Corporation; solvent: deuterated dimethylsulfoxide; and frequency: 300 MHz); and $^{13}$C-NMR (e.g., device: AL-300 (manufactured by JEOL (Nihon Denshi) Corporation); solvent: deuterated dimethylsulfoxide; and frequency: 300 MHz). The chemical structure of the electrolyte salt (A) may be identified in the same manner.

For reducing the contents of the imidazolium salts (B1) and (B2), there are one way to inhibit generation of the imidazolium salts (B1) and (B2) in the process of the preparation of the electrolyte salt (A), and another way to remove the imidazolium salts (B1) and (B2) after the preparation of the electrolyte salt (A).

As the way to inhibit generation of the imidazolium salts (B1) and (B2) in the process of the preparation of the electrolyte salt (A), it may be applicable to reduce the concentration of carbon dioxide in the reaction system.

The electrolyte salt (A) may be generally prepared, for example, by means of reacting N-alkyl imidazole (which may be obtained as a commercial product, or may be prepared by alkylation of an imidazole by an alkylation agent (such as dimethyl carbonate, diethyl carbonate, dipropyl carbonate, diisopropyl carbonate, methyl halide, ethyl halide, propyl halide, isopropyl halide, dimethyl sulfate, diethyl sulfate, dipropyl sulfate and diisopropyl sulfate)) with dialkyl carbonate (such as dimethyl carbonate, diethyl carbonate, dipropyl carbonate, and diisopropyl carbonate) in a proton polar solvent (such as an alcohol having a carbon number of 1 to 3, including methanol, ethanol, 1-propanol and 2-propanol) at a temperature of 100 to 180° C. under a pressurized condition (See JP Patent No. 2140853). The electrolyte salt (A) may be prepared by alkylation of N-alkyl imidazole by alkylation agent other than the dialkyl carbonate, such as methyl halide, ethyl halide, propyl halide, dimethyl sulfate, diethyl sulfate, dipropyl sulfate and diisopropyl sulfate. However, it is preferable to alkylate the dialkyl carbonate in view of ion residues (such as halogen ions and sulfate ion).

In order to reduce a concentration of carbon dioxide in the reaction system, it is applicable to increase the amount of dimethyl carbonate, diethyl carbonate, dipropyl carbonate, diisopropyl carbonate and/or the proton polar solvent, for decreasing the concentration of carbon dioxide in the reaction system, as well as to carry out the reaction while removing carbon dioxide outside the reaction system.

The proton polar solvent may be used at an amount of 10 to 1000 wt %, and in particular, of 50 to 800 wt %, and in more particular, of 100 to 600 wt %, and in most particular, of 200 to 400 wt %, based on the weight of N-alkyl imidazole.

Carbon dioxide gas in the reaction system can be removed outside the system by means of adjusting a valve for releasing the pressure raised by the gas, which generates in the process of the reaction. Generally, only a gas such as carbon dioxide can be removed from the reaction system by passing the gas through a cooling condenser for condensing a solvent such as methanol, which is returned into the reaction vessel. In such case, the pressure is preferably at 1 to 10 MPa, and more preferably at 2 to 9 MPa, and further more preferably at 3 to 8, and most preferably at 3.5 to 7 MPa. Further, an inert gas such as nitrogen gas and argon gas can be injected into the system in order to release more amounts of carbon dioxide from the system. It may be applicable to add a chemical material to adsorb carbon dioxide (such as calcium oxide) into the system. However, it would be more preferable to release the gas by means of adjusting the valve than that, in view of ion residues.

Carbon dioxide gas is preferably included in the reaction system in a molar number of 0.01 to 3, and in particular, of 0.02 to 2, and in more particular, of 0.03 to 1 and in most particular, of 0.04 to 0.1, based on that of N-alkyl imidazole.

Also, in order to remove the imidazolium salts (B1) and (B2) after the preparation, it would be applicable to an adsorption treatment by an adsorbent (such as silica gel, activated carbon, activated alumina and molecular sieve (e.g., 3A 1/16 manufactured by Nacalai Tesque Corporation), a method for removing them by means of recrystallization, a method for washing them by using a solvent, a method for extracting by using a solvent, and etc. These methods may be used solely or in combination thereof.

Also, the recrystallization would be accomplished either by dissolving them into a solvent followed by lowering the temperature or by gradually evaporating the solvent, so as to deposit crystals, or by gradually adding a poor solvent so as to deposit crystals.

The washing and extraction would be accomplished either by using a separating funnel in which crystals are suspended in a solvent followed by separating the crystals from the solvent, or by using a magnetic stirrer to suspend crystals in a solvent followed by separating the crystals from the solvent. The solvent useful for the recrystallization, washing and extraction may include an alcohol having a carbon number of 1 to 3 (such as methanol, ethanol, n-propanol and isopropanol); a ketone having a carbon number of 3 to 6 (such as acetone, methyl ethyl ketone, diethyl ketone and methyl isobutyl ketone); and an ether having a carbon number of 4 to 6 (such as diethyl ether, ethyl-n-propyl ether, ethyl isopropyl ether, di-n-propyl ether, diisopropyl ether, n-propyl isopropyl ether, dimethoxy ethane, methoxy ethoxy ethane and diethoxy ethane). These solvents may be used solely or in combination thereof. The solvent, while be varied depending on the kind of the solvent, may be used in the process of the recrystallization, washing or extraction at an amount of 0.5 to 10 times as large as, and in particular, at an amount of 1 to 8 times as large as, and in more particular, 1.5 to 6 times as large as, and in most particular, 2 to 5 times as large as, the weight of electrolyte salt (A), in view of the amount necessary for dissolving the compounds (B1) and (B2) as impurities, and in view of less losing the electrolyte salt (A). Also, the solvent for use in the washing or extraction, while be varied depending on the kind of the solvent, may preferably have a temperature of 30° C. or less, and in particular, of 20° C. or less, and in more particular, of 10° C. or less, and in most particular, of 0° C. or less.

As the poor solvent, a solvent having a low solubility of an electrolyte and a low polar property can be used, which may include hexane, heptane, toluene, xylene, etc.

The electrolytic solution of the present invention may include a non-aqueous solvent. A known solvent may be appropriately selected as the non-aqueous solvent, with considering a solubility of the electrolytic salt (A) and an electrochemical stability thereof. The followings can be used. Among them, it may be possible to use the combination of two or more.

Ethers: acyclic ethers having a carbon number of 4 to 12 (such as diethyl ether, methyl isopropyl ether, ethyleneglycol dimethyl ether, diethyleneglycol dimethyl ether, triethyleneglycol diethyl ether, tetraethyleneglycol diethyl ether, diethyleneglycol diethyl ether, triethyleneglycol dimethyl ether, etc.); cyclic ethers having a carbon number of 4 to 12 (such as tetrahydrofuran, 1,3-dioxolan, 1,4-dioxane, 4-butyl dioxolan, crown ether (1,4,7,10,13,16-hexaoxa cyclooctadecan, etc.)

Amidos: acyclic amides having a carbon number of 3 to 6 (such as N,N-dimethylformamide, N,N-dimethylacetamide, N,N-dimethylpropionamide, hexamethylphosphorylamide, etc.); and cyclic amides having a carbon number of 4 to 6 (such as pyrrolidinone, N-methylpyrrolidinone, N-vinylpyrrolidinone, etc.);

carboxylate esters: acyclic esters having a carbon number of 3 to 8 (methyl acetate, methyl propionate, dimethyl adipate, etc.); and cyclic esters having a carbon number of 4 to 5 (γ-butyrolactone, α-acetyl-γ-butyrolactone, β-butyrolactone, γ-valerolactone, δ-valerolactone, etc.);

nitriles: nitriles having a carbon number of 2 to 5 (such as acetonitrile, glutaronitrile, adiponitrile, methoxyacetonitrile, 3-methoxypropionitrile, 3-ethoxypropionitrile, acrylonitrile, etc.);

carbonates: acyclic carbonates having a carbon number of 3 to 4 (such as dimethyl carbonate, ethyl methyl carbonate, diethyl carbonate, etc.); and cyclic carbonates having a carbon number of 3 to 4 (such as ethylene carbonate, propylene carbonate, butylene carbonate, vinylene carbonate, etc.);

sulfoxides: acyclic sulfoxides having a carbon number of 2 to 6 (such as dimethylsulfoxide, dipropylsulfoxide, etc.);

sulfones: cyclic sulfones having a carbon number of 4 to 6 (such as sulforan, 3-methyl sulforan, 2,4-dimethyl sulforan, etc.);

nitro compounds: nitromethane, nitroethane, etc.; and other cyclic compounds: N-methyl-2-oxazolidinone, 3,5-dimethyl-2-oxazolidinone, 1,3-dimethyl-2-imidazolidinone, etc.

Among them, it is preferable to use carbonates, sulfones, carboxylate esters, and nitrites. It is more preferable to use carbonates, sulfones and nitrites. In particular, it is preferable to use ethylene carbonate, propylene carbonate and sulforan. In more particular, it is preferable to use propylene carbonate and sulforan. These non-aqueous solvents may be used as a mixture of two or more of the solvents. In case of such a mixture, it is preferable to include, as a major component, at least one non-aqueous solvent selected from the group consisting of propylene carbonate, ethylene carbonate, butylene carbonate, sulforan, methyl sulforan, acetonitrile, γ-butyrolactone, dimethyl carbonate, ethyl methyl carbonate and diethyl carbonate. In more detail, it is preferable to include, as a major component, at least one non-aqueous solvent selected from the group consisting of propylene carbonate, ethylene carbonate, sulforan, acetonitrile and γ-butyrolactone. In more particular, it is preferable to include, as a major component, at least one non-aqueous solvent selected from the group consisting of propylene carbonate, sulforan and acetonitrile. In the description here, the term "as a major component" means that such a solvent is included in an amount of 50 to 99 wt %, and in particular, of 70 to 90 wt %. When the major component is at least one selected from the group consisting of propylene carbonate, ethylene carbonate, sulforan, acetonitrile and γ-butyrolactone, a second solvent can be at least one selected from dimethyl carbonate, ethyl methyl carbonate and diethyl carbonate. In particular, dimethyl carbonate and ethyl methyl carbonate, and more in particular, dimethyl carbonate is selected as the second solvent. In the present invention, the second solvent is included in the non-aqueous solvent in an amount of 1 to 50 wt %, and in particular, in an amount of 10-30 wt %.

The content of the non-aqueous solvent included in the electrolytic solution is preferably at 30 to 95 wt %, and in particular, at 40 to 90 wt %, and in more particular, at 50 to 85 wt %, and in most particular, at 60 to 80 wt %. In other words, the lower limit of the contents of the non-aqueous solvent included in the electrolytic solution is preferably at 30 wt %, and more preferably at 40 wt %, and further more preferably at 50 wt %, and most preferably at 60 wt %, and in a similar manner, the upper limit of the content is preferably at 95 wt %, and more preferably at 90 wt %, and further more preferably at 85 wt %, and most preferably at 80 wt %. Within the range, less precipitation of salts would occur at a low temperature, resulting in further improving the performance deterioration with time of the electrochemical capacitor.

The water content in the electrolytic solution is, in view of electrochemical stability, preferably at 300 ppm or less, and in particular, at 100 ppm or less, and in more particular, at 50 ppm or less. Within the range, the performance deterioration with time of the electrochemical capacitor can be avoided. The water content in an electrolytic solution can be measured by means of Karl Fischer's method (JIS K0113-1997, coulometric titration method)

The range of the water content may be adjusted within the defined range in the electrolytic solution, by means of using an electrolyte salt (A) which is previously dried fully and using a non-aqueous solvent which is previously dehydrated fully.

Such drying may be carried out under a reduced pressure and under heated (for example, heated at a reduced pressure of 20 Torr and at a temperature of 150° C.), so as to evaporate and remove an included small amount of water.

Such dehydration can be accomplished by subjecting it to a heated dehydration under a reduced pressure (for example, heated at a reduced pressure of 100 Torr), or by using a dehydrating agent such as molecular sieve (3A 1/16, etc, manufactured by Nacalai Tesque Corporation), activated alumina powder, etc.

In addition to the above, there may be a method of subjecting the electrolytic solution to a heated dehydration under a reduced pressure (for example, heated at a reduced pressure of 100 Torr and at a temperature of 100° C.) so as to evaporate and remove the including small amount of water, or to use a dehydrating agent such as molecular sieve, activated alumina powder, etc. These methods may be performed solely or in combination thereof. Among them, the methods of heating and drying the compound (A) under a reduced pressure, or method to add a molecular sieve into an electrolytic solution are preferably used.

The electrolytic solution of the present invention may be adapted for an electrochemical capacitor. The electrochemical capacitor includes, as a fundamental structure thereof, electrodes, a collector, and a separator, and may have a case, gasket, etc. which are generally used in a capacitor. An electrolytic solution may be impregnated into an electrode and a separator inside a glove box, etc. in an atmosphere of argon (having a dew point of −50° C.). Among various electrochemical capacitors, the electrolytic solution of the present invention is preferably used in an electrical double layer capacitor (which may have a polar electrode as its electrode, using an activated carbon, etc.)

The electrical double layer capacitor has, as a fundamental structure thereof, two polar electrodes, and a separator provided therebetween, which are impregnated with an electrolytic solution. The major component of the polar electrodes needs to be electrochemically inert with the electrolytic solution, and to have an appropriate electric conductivity. Thus, it may be preferably of graphite, a carbon material such as a polyacene organic semiconductor, etc., and as describe above, at least one of the positive electrode and the negative electrode is of a carbon material. In view of accomplishing a large electrode interface where an electric charge is accumulated, it would be preferable to use a porous carbon material (e.g., activated carbon) having a relative surface area of 10 $m^2/g$ or more based on the measurement by means of a BET method using a nitrogen adsorption method. The relative surface area of a porous carbon material is selected in considering a targeted capacitance per unit ($F/m^2$) and considering reduction of a dimension density due to the increase of the relative surface area. Thus, it would be preferable to use an activated carbon having a relative surface area of 30 to 2,500 $m^2/g$ based on the measurement by means of a BET method using a nitrogen adsorption method, and further in view of a large capacitance per volume, it would be preferable to use an activated carbon having the relative surface area of 300 to 2,300 $m^2/g$.

The electrolytic solution of the present invention may be also adapted for an aluminum electrolytic capacitor. The fundamental structure of the aluminum electrolytic capacitor is prepared by subjecting an aluminum foil, which is to be an electrode, to an electrochemical treatment to form an oxide film on the surface thereof, to make it functioning as a dielectric material, and providing an electrolytic paper impregnated with an electrolytic solution between the electrode and a counter electrode of an aluminum foil.

The electrochemical capacitor of the present invention is in a form of coin type, wound type, and rectangular type. The electrolytic solution of the present invention may be preferably adapted either for the electric double layer capacitor or the aluminum electrolytic capacitor.

EXAMPLES

The examples and comparative examples of the present invention are described as follows, but the present invention shall not be limited thereto. So long as other specific description is provided, the term "parts" means "parts by weight" in the following description.

Example 1

82 parts of 2-methylimidazole (CUREZOL 2MZ manufactured by Shikoku Chemicals Corporation), 144 parts of tetrahydrofuran, and 56 parts of potassium hydroxide were put into an autoclave made of a stainless steel equipped with a cooling condenser and mixed homogenously. Then, the temperature was raised to 70° C., and 71 parts of ethyl chloride were gradually put in drops therein. The temperature was found to be raised due to the reaction, the dropping was taken for a period of about 2 hours in order to keep the temperature at a range of 70° C.±5° C., and after finishing the dropping, they were aged for a period of about 2 hours. The resultant reactant was distilled to obtain 50 parts of 1-ethyl-2-methylimidazole.

110 parts of 1-ethyl-2-methylimidazole, as prepared, 135 parts of dimethyl carbonate and 192 parts of methanol were put into an autoclave made of a stainless steel equipped with a cooling condenser and mixed homogenously. After nitrogen substitution, the temperature was then raised to 130° C. while being sealed, so as to initiate a reaction. At the beginning, the pressure was approximately at 4.5 Kg/cm$^2$, but it was gradually raised due to generation of carbon dioxide, so that the gasses were appropriately released from the upper part of the cooling condenser, adjusted at a pressure of about 7 Kg/cm$^2$ or less. After 60 hours, they were cooled at 30° C., and the result of the reacted solution by means of $^1$H-NMR showed that 1-ethyl-2-methylimidazole was disappeared and 1-ethyl-2,3-dimethylimidazolium monomethyl carbonate was produced approximately under a quantitative theory. Into 428 parts of the resultant solution of 1-ethyl-2,3-dimethylimidazolium monomethyl carbonate, methanol and dimethyl carbonate, 205 parts of an aqueous solution of fluoroboric acid at a concentration of 42 wt % were gradually put in drops with stirring at a temperature of 25° C. over a period of about 30 minutes. As putting them in drops, bubbles of carbon dioxide were generated. Finishing the dropping and the generation of the bubbles, all the solvents were removed at a pressure of 20 Torr and at a temperature of 150° C., so as to obtain 208 parts of a white solid (1). The examinations of $^1$H-NMR, $^{19}$F-NMR, $^{13}$C-NMR and HPLC resulted in showing that 98 mol % of 1-ethyl-2,3-dimethylimidazolium tetrafluoroborate (which is hereinafter shortened as "EDMI.BF$_4$"), 2 mol %, in total, of 1-ethyl-2,3-dimethyl-4-carboxylate imidazolium, 1-ethyl-2,3-dimethyl-5-carboxylate imidazolium, 1-ethyl-2,3-dimethyl-4-carboxylate-5-carboxy imidazolium and 1-ethyl-2,3-dimethyl-4-carboxy-5-carboxylate imidazolium. The HPLC analysis was performed in the conditions as described above. The conditions were the same in the following examples.

212 parts of the resultant white solid (1) were dissolved wholly into propylene carbonate, to obtain 1 liter of an electrolyte solution. Into 100 parts of the electrolyte solution, 3 parts of a molecular sieve (Type 3A 1/16 manufactured by Nacalai Tesque Corporation) were added, and left and dried them at a temperature of 25° C. for a period of 60 hours, so as to obtain an electrolytic solution 1. The electrolytic solution had a water content of 5 ppm.

Example 2

400 g of the white solid (1) obtained in Example 1 were added into 2000 ml of methanol, and heated at a temperature of 60° C. for dissolution, followed by subjecting them to filtration under heated. The filtrated liquid was gradually cooled to 15° C., and thereby deposited crystals were collected by filtration. The collected crystals were washed with methanol at a temperature of 15° C., followed by drying them under a reduced pressure, so as to obtain a white solid (2). The examinations of $^1$H-NMR, $^{19}$F-NMR, $^{13}$C-NMR and HPLC resulted in showing that the white solid (2) included 99.95 mol % of EDMI.BF$_4$, and 0.05 mol %, in total, of 1-ethyl-2,3-dimethyl-4-carboxylate imidazolium, 1-ethyl-2,3-dimethyl-5-carboxylate imidazolium, 1-ethyl-2,3-dimethyl-4-carboxylate-5-carboxy imidazolium and 1-ethyl-2,3-dimethyl-4-carboxy-5-carboxylate imidazolium.

212 parts of the resultant white solid (2) were dissolved wholly into propylene carbonate, to obtain 1 liter of an electrolyte solution. Into 100 parts of the electrolyte solution, 3 parts of a molecular sieve were added, and left and dried them at a temperature of 25° C. for a period of 60 hours, so as to obtain an electrolytic solution 2. The electrolytic solution had a water content of 5 ppm.

212 parts of the resultant white solid (2) obtained in Example 2 were dissolved wholly into a mixture solvent of propylene carbonate and ethylene carbonate (weight ratio of 1:1), to obtain 1 liter of an electrolytic solution. Into 100 parts of the electrolyte solution, 3 parts of a molecular sieve were added, and left and dried them at a temperature of 25° C. for a period of 60 hours, so as to obtain an electrolytic solution 3. The electrolytic solution had a water content of 5 ppm.

Example 4

96 parts of 1,2-dimethylimidazole (CUREZOL 1.2DMZ manufactured by Shikoku Chemicals Corporation), 135 parts of dimethyl carbonate and 192 parts of methanol were put into an autoclave made of a stainless steel equipped with a cooling condenser and mixed homogenously. After nitrogen substitution, the temperature was then raised to 130° C. while being sealed, so as to initiate a reaction. At the beginning, the pressure was approximately at 4.5 Kg/cm$^2$, but it was gradually raised due to generation of carbon dioxide, so that the gasses were appropriately released from the upper part of the cooling condenser, adjusted at a pressure of about 7 Kg/cm$^2$ or less. After 60 hours, they were cooled at 30° C., and the result of the reacted solution by means of $^1$H-NMR showed that 1,2-dimethylimidazole was disappeared and 1,2,3-trimethylimidazolium monomethyl carbonate was produced approximately under a quantitative theory. Into 415 parts of the resultant solution of 1,2,3-trimethylimidazolium monomethyl carbonate, methanol and dimethyl carbonate, 205 parts of an aqueous solution of fluoroboric acid at a concentration of 42 wt % was gradually put in drops while stirring at a temperature of 25° C. over a period of about 30 minutes. As putting it in drops, bubbles of carbon dioxide were generated. Finishing the dropping and the generation of the bubbles, all the solvents were removed at a pressure of 20 Torr and at a temperature of 150° C., so as to obtain 194 parts of a white solid (3). The examinations of $^1$H-NMR, $^{19}$F-NMR, $^{13}$C-NMR and HPLC of the white solid (3) resulted in showing that 98 mol % of 1,2,3-trimethylimidazolium tetrafluoroborate (which is hereinafter shortened as "TMI.BF$_4$"), 2 mol %, in total, of 1,2,3-trimethyl-4-carboxylate imidazolium and 1,2,3-trimethyl-4-carboxy-5-carboxylate imidazolium.

198 parts of the resultant white solid (3) were dissolved wholly into propylene carbonate, to obtain 1 liter of an electrolyte solution. Into 100 parts of the electrolyte solution, 3 parts of a molecular sieve were added, and left and dried them at a temperature of 25° C. for a period of 60 hours, so as to obtain an electrolytic solution 4. The electrolytic solution had a water content of 5 ppm.

Example 5

400 g of the white solid (3) obtained in Example 4 was added into 2000 ml of methanol, and heated at a temperature of 60° C. for dissolution, followed by subjecting them to filtration under heated. The filtrated liquid was gradually cooled to 15° C., and thereby deposited crystals were collected by filtration. The collected crystals were washed with methanol at a temperature of 15° C., followed by drying them under a reduced pressure, so as to obtain a white solid (4). The examinations of $^1$H-NMR, $^{19}$F-NMR, $^{13}$C-NMR and HPLC of the white solid (4) resulted in showing that the white solid (4) included 99.95 mol % of TMI.BF$_4$, and 0.05 mol %, in total, of 1,2,3-trimethyl-4-carboxylate imidazolium and 1,2,3-trimethyl-4-carboxy-5-carboxylate imidazolium.

198 parts of the resultant white solid (4) were dissolved wholly into propylene carbonate, to obtain 1 liter of an electrolytic solution. Into 100 parts of the electrolyte solution, 3 parts of a molecular sieve were added, and left and dried them at a temperature of 25° C. for a period of 60 hours, so as to obtain an electrolytic solution 5. The electrolytic solution had a water content of 2 ppm.

Example 6

400 g of the white solid (3) obtained in Example 4 was added into 500 ml of acetone, and suspended them at a temperature of 25° C. for a period of 5 hours, followed by subjecting them to filtration using a glass filter. The solids on the glass filter were washed with methanol at a temperature of 15° C., followed by drying them under a reduced pressure. The examinations of $^1$H-NMR, $^{19}$F-NMR, $^{13}$C-NMR and HPLC resulted in showing that the white solid (5) included 99.9 mol % of TMI.BF$_4$, and 0.1 mol %, in total, of 1,2,3-trimethyl-4-carboxylate imidazolium and 1,2,3-trimethyl-4-carboxy-5-carboxylate imidazolium.

198 parts of the resultant white solid (5) were dissolved wholly into propylene carbonate, to obtain 1 liter of an electrolytic solution. Into 100 parts of the electrolyte solution, 3 parts of a molecular sieve were added, and left and dried them at a temperature of 25° C. for a period of 60 hours, so as to obtain an electrolytic solution 6. The electrolytic solution had a water content of 2 ppm.

Example 7

212 parts of the resultant white solid (5) obtained in Example 6 were dissolved wholly into a mixture solvent of propylene carbonate and dimethyl carbonate (weight ratio of 7:3), to obtain 1 liter of an electrolytic solution. Into 100 parts of the electrolyte solution, 3 parts of a molecular sieve were added, and left and dried them at a temperature of 25° C. for a period of 60 hours, so as to obtain an electrolytic solution 7. The electrolytic solution had a water content of 3 ppm.

Example 8

212 g of the white solid (2) prepared in Example 2 was dissolved in a mixed solvent of propylene carbonate and dimethyl carbonate (weight ratio=1:1) to obtain 1 liter of an electrolyte solution. Into 100 parts of the electrolyte solution, 3 parts of a molecular sieve were added, and left and dried them at a temperature of 25° C. for a period of 60 hours, so as to obtain an electrolytic solution 8. The electrolytic solution had a water content of 3 ppm.

Example 9

212 g of the white solid (2) prepared in Example 2 was dissolved in a mixed solvent of propylene carbonate and ethyl methyl carbonate (weight ratio=1:1) to obtain 1 liter of an electrolyte solution. Into 100 parts of the electrolyte solution, 3 parts of a molecular sieve were added, and left and dried them at a temperature of 25° C. for a period of 60 hours, so as to obtain an electrolytic solution 9. The electrolytic solution had a water content of 3 ppm.

Example 10

212 g of the white solid (1) prepared in Example 1 was dissolved in sulforan to obtain 1 liter of an electrolyte solution. Into 100 parts of the electrolyte solution, 3 parts of a molecular sieve were added, and left and dried them at a temperature of 25° C. for a period of 60 hours, so as to obtain an electrolytic solution 10. The electrolytic solution had a water content of 3 ppm.

Example 11

198 g of the white solid (3) prepared in Example 4 was dissolved in sulforan to obtain 1 liter of an electrolyte solution. Into 100 parts of the electrolyte solution, 3 parts of a molecular sieve were added, and left and dried them at a temperature of 25° C. for a period of 60 hours, so as to obtain an electrolytic solution 11. The electrolytic solution had a water content of 3 ppm.

Example 12

212 g of the white solid (5) prepared in Example 6 was dissolved in a mixed solvent of sulforan and dimethyl carbonate (weight ratio=7:3) to obtain 1 liter of an electrolyte solution. Into 100 parts of the electrolyte solution, 3 parts of a molecular sieve were added, and left and dried them at a temperature of 25° C. for a period of 60 hours, so as to obtain an electrolytic solution 12. The electrolytic solution had a water content of 3 ppm.

Example 13

212 g of the white solid (2) prepared in Example 2 was dissolved in a mixed solvent of sulforan and dimethyl carbonate (weight ratio=1:1) to obtain 1 liter of an electrolyte solution. Into 100 parts of the electrolyte solution, 3 parts of a molecular sieve were added, and left and dried them at a temperature of 25° C. for a period of 60 hours, so as to obtain an electrolytic solution 13. The electrolytic solution had a water content of 3 ppm.

Example 14

212 g of the white solid (2) prepared in Example 2 was dissolved in a mixed solvent of sulforan and ethyl methyl carbonate (weight ratio=1:1) to obtain 1 liter of an electrolyte solution. Into 100 parts of the electrolyte solution, 3 parts of a molecular sieve were added, and left and dried them at a temperature of 25° C. for a period of 60 hours, so as to obtain an electrolytic solution 14. The electrolytic solution had a water content of 3 ppm.

Comparative Example 1

96 parts of 1-ethylimidazole, 135 parts of dimethyl carbonate and 192 parts of methanol were put into an autoclave made of a stainless steel equipped with a cooling condenser and mixed homogenously. After nitrogen substitution, the temperature was then raised to 130° C. while being sealed, so as to initiate a reaction. At the beginning, the pressure was approximately at 4.5 Kg/cm$^2$, but it was gradually raised due to generation of carbon dioxide, so that the gasses were appropriately released from the upper part of the cooling condenser, adjusted at a pressure of about 7 Kg/cm$^2$ or less. After 60 hours, they were cooled at 30° C., and the result of the reacted solution by means of $^1$H-NMR showed that 1-ethylimidazole was disappeared and 1-ethyl-3-methylimidazolium monomethyl carbonate was produced approximately under a quantitative theory. Into 415 parts of the resultant solution of 1-ethyl-3-methylimidazolium monomethyl carbonate, methanol and dimethyl carbonate, 205 parts of an aqueous solution of fluoroboric acid at a concentration of 42 wt % were gradually put in drops with stirring at a temperature of 25° C. over a period of about 30 minutes. As putting them in drops, bubbles of carbon dioxide were generated. Finishing the dropping and the generation of the bubbles, all the solvents were removed at a pressure of 20 Torr and at a temperature of 150° C., so as to obtain 194 parts of a transparent and colorless liquid (1). The examinations of $^1$H-NMR, $^{19}$F-NMR, $^{13}$C-NMR and HPLC of the liquid (1) resulted in showing that 98 mol % of 1-ethyl-3-methyl imidazolium tetrafluoroborate (which is hereinafter shortened as "EMI.BF$_4$"), 2 mol %, in total, of 1-ethyl-3-methyl-4-carboxylate imidazolium, 1-ethyl-3-methyl-5-carboxylate imidazolium, 1-ethyl-3-methyl-4-carboxylate-5-carboxy imidazolium and 1-ethyl-3-methyl-4-carboxy-5-carboxylate imidazolium.

198 parts of the resultant liquid (1) were dissolved wholly into propylene carbonate, to obtain 1 liter of an electrolyte solution. Into 100 parts of the electrolyte solution, 3 parts of a molecular sieve were added, and left and dried them at a temperature of 25° C. for a period of 60 hours, so as to obtain a comparative electrolytic solution 1. The electrolytic solution had water content of 10 ppm.

Comparative Example 2

82 parts of 1-methylimidazole, 135 parts of dimethyl carbonate and 192 parts of methanol were put into an autoclave made of a stainless steel equipped with a cooling condenser and mixed homogenously. After nitrogen substitution, the temperature was then raised to 130° C. while being sealed, so as to initiate a reaction. At the beginning, the pressure was approximately at 4.5 Kg/cm$^2$, but it was gradually raised due to generation of carbon dioxide, so that the gasses were appropriately released from the upper part of the cooling condenser, adjusted at a pressure of about 7 Kg/cm$^2$ or less. After 60 hours, they were cooled at 30° C., and the result of the reacted solution by means of $^1$H-NMR showed that 1-methylimidazole was disappeared and 1,3-dimethylimidazolium monomethyl carbonate was produced approximately under a quantitative theory. Into 401 parts of the resultant solution of 1,3-dimethylimidazolium monomethyl carbonate, methanol and dimethyl carbonate, 205 parts of an aqueous solution of fluoroboric acid at a concentration of 42 wt % were gradually put in drops with stirring at a room temperature over a period of about 30 minutes. As putting them in drops, bubbles of carbon dioxide were generated. Finishing the dropping and the generation of the bubbles, all the solvents were removed at a pressure of 20 Torr and at a temperature of 150° C., so as to obtain 180 parts of a white solid (6). The examinations of $^1$H-NMR, $^{19}$F-NMR, $^{13}$C-NMR and HPLC of the white solid (6) resulted in showing that 98 mol % of 1,3-diethyl imidazolium tetrafluoroborate (which is hereinafter shortened as "DMI.BF$_4$"), 2 mol %, in total, of 1,3-dimethyl-4-carboxylate imidazolium and 1,3-dimethyl-4-carboxy-5-carboxylate imidazolium.

184 parts of the resultant white solid (6) were dissolved wholly into propylene carbonate, to obtain 1 liter of an electrolyte solution. Into 100 parts of the electrolyte solution, 3 parts of a molecular sieve were added, and left and dried them at a temperature of 25° C. for a period of 60 hours, so as to obtain a comparative electrolytic solution 2. The electrolytic solution had a water content of 10 ppm.

Comparative Example 3

198 g of the liquid (1) as obtained was dissolved in sulforan to obtain 1 liter of an electrolyte solution. Into 100 parts of the electrolyte solution, 3 parts of a molecular sieve were added, and left and dried them at a temperature of 25° C. for a period of 60 hours, so as to obtain a comparative electrolytic solution 3. The electrolytic solution had a water content of 10 ppm.

Comparative Example 4

184 g of the white solid (6) as obtained was dissolved in sulforan to obtain 1 liter of an electrolyte solution. Into 100 parts of the electrolyte solution, 3 parts of a molecular sieve were added, and left and dried them at a temperature of 25° C. for a period of 60 hours, so as to obtain a comparative electrolytic solution 4. The electrolytic solution had a water content of 10 ppm.

Using the electrolytic solutions 1 to 14 according to the present invention and the comparative electrolytic solutions 1 to 4, electrochemical capacitors in type of a wound type were prepared to evaluate a self-discharge property and a capacitance retention rate, whose results are summarized in Table 1.

(1) Self-Discharge Property

Using the electrolytic solutions 1 to 14 according to the present invention and the comparative electrolytic solutions 1 to 4, eighteen kinds of electrochemical capacitors in type of a wound type (having a size of 18 mm in diameter and 150 mm in length, a rated voltage: 2.3V, and positive and negative electrodes: activated carbon) were prepared, and the capacitors in type of a wound type were used to measure the self-discharge property, which was evaluated as a voltage proof of the electrolytic solution.

<Method for Measuring a Self-Discharge Property>

The electrochemical capacitors of a wound type were charged at a temperature of 25° C. at a voltage of 2.5V for a period of 24 hours, followed by leaving them at a temperature of 25° C. for a period of 50 hours. Then, a voltage between the terminals of the wound type electrochemical capacitors was measured. The voltage between the terminals (remaining voltage), obtained in this measurement, was evaluated as the self-discharge property. The higher the remaining voltage is, the better (higher) the self-discharge property (voltage proof) is, and in other word, the lower the remaining voltage is, the worse (lower) the self-discharge property (voltage proof) is.

(2) Capacitance Retention Rate

The wound type electrochemical capacitors prepared in the section (1) above were subjected to a high temperature load test of a voltage of 2V at a temperature of 70° C., and calculating a capacitance retention rate after 1000 hours by the following formula:

Capacitance Retention Rate (%) = [(capacitance after 1000 hours/(capacitance at the beginning)] × 100

<Method for Measuring a Capacitance>

The electrochemical capacitors of a wound type were charged at a temperature of 25° C. at a voltage of 2.0V for a period of 1 hour, followed by subjecting them to a constant current discharge at a current of 1 A, while measuring a period for reducing the voltage of the terminals of the wound type electrochemical capacitors from 1.7V to 1.3V, calculating a capacitance by the following formula:

$$C = i \times \Delta t / \Delta V \quad \text{(Formula 2)}$$

This formula is obtained by the relationship: $Q = i \times t = C \times V$, where "Q" represents a discharged electric charge (C), "i" represents a discharge current (A), "t" represents a discharge period (sec), "C" represents a capacitance (F), and "V" represents a voltage (V), satisfying the equations of i=1 (A) and $\Delta V = 1.7 - 1.3 = 0.4$ (V).

comparative electrolytic solutions 1 to 4. Thus, it is apparent that the electrolytic solutions of the present invention significantly improve the performance deterioration with time of the electrochemical capacitors. It would be noted that the electrolytic solutions in Examples 1 to 14 of the present invention, even in the case of application of an electrochemical capacitor and continuously subjecting it to a voltage, did not show an alkalinity to deteriorate a rubber packing for the prevention of leak, resulting in high reliability as to leak.

INDUSTRIAL APPLICABILITY

The electrolytic solution of the present invention is superior in voltage proof so that the electrochemical capacitor using such electrolytic solution shows much less performance deterioration with time than conventional electrochemical capacitors. Therefore, it would be applicable to various electronic devices for memory backup, various power sources as a back-up power source, battery equipments which may be substituted with secondary batteries such as battery elements used in combination with solar batteries, power sources for driving motors requiring a large amount of electric current, power sources for power tools such as electric tools, and power sources for battery cars.

What is claimed is:

1. An electrolytic solution, comprising:
   an electrolyte salt (A) made of 1-ethyl-2,3-dimethyl imidazolium tetrafluoroborate.

TABLE 1

| | Electrolyte | Content of (B1) and (B2) (mole %) | Solvent | Self-discharge property (V) | Capacitance Retention Rate (%) |
|---|---|---|---|---|---|
| Example 1 | EDMI · BF$_4$ | 2 | PC | 2.38 | 94 |
| Example 2 | EDMI · BF$_4$ | 0.05 | PC | 2.42 | 96 |
| Example 3 | EDMI · BF$_4$ | 0.05 | PC/EC | 2.43 | 97 |
| Example 4 | TMI · BF$_4$ | 2 | PC | 2.38 | 95 |
| Example 5 | TMI · BF$_4$ | 0.05 | PC | 2.45 | 97 |
| Example 6 | TMI · BF$_4$ | 0.1 | PC | 2.43 | 96 |
| Example 7 | TMI · BF$_4$ | 0.1 | PC/DMC | 2.44 | 97 |
| Example 8 | EDMI · BF$_4$ | 0.05 | PC/DMC | 2.43 | 97 |
| Example 9 | EDMI · BF$_4$ | 0.05 | PC/EMC | 2.43 | 97 |
| Example 10 | EDMI · BF$_4$ | 2 | SL | 2.39 | 95 |
| Example 11 | TMI · BF$_4$ | 2 | SL | 2.40 | 96 |
| Example 12 | TMI · BF$_4$ | 0.1 | SL/DMC | 2.44 | 97 |
| Example 13 | EDMI · BF$_4$ | 0.05 | SL/DMC | 2.44 | 97 |
| Example 14 | EDMI · BF$_4$ | 0.05 | SL/EMC | 2.44 | 97 |
| Comparative Example 1 | EMI · BF$_4$ | 2 | PC | 2.16 | 87 |
| Comparative Example 2 | DMI · BF$_4$ | 2 | PC | 2.16 | 87 |
| Comparative Example 3 | EMI · BF$_4$ | 2 | SL | 2.26 | 89 |
| Comparative Example 4 | DMI · BF$_4$ | 2 | SL | 2.26 | 89 |

EDMI · BF$_4$: 1-ethyl-2,3-dimethylimidazolium tetrafluoroborate
TMI · BF$_4$: 1,2,3-trimethylimidazolium tetrafluoroborate
EMI · BF$_4$: 1-ethyl-3-methylimidazolium tetrafluoroborate
DMI · BF$_4$: 1,3-dimethylimidazolium tetrafluoroborate
PC: propylene carbonate
EC: ethylene carbonate
DMC: dimethyl carbonate
EMC: ethyl methyl carbonate
SL: sulforan As is apparent from Table 1, the electrochemical capacitors using the electrolytic solutions 1 to 14 of the present invention have self-discharge properties and capacitance retention rates higher than those of the electrochemical capacitors using the 2. An electrolytic solution according to claim 1, further comprising a first imidazolium salt (B1) shown as the following formula (2), and a second imidazolium salt (B2) shown as the following formula (3):

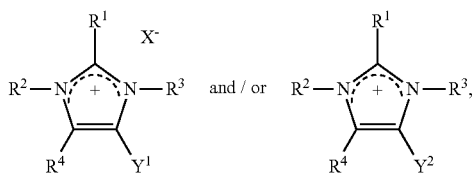

(2)

where "$R^1$," "$R^2$," and "$R^3$" independently represent an alkyl group having a carbon number of 1 to 3, "$R^4$" represents hydrogen atom or an alkyl group having a carbon number of 1 to 3, "X" represents a counterpart anion, "$Y^1$" represents carboxyl group ($-CO_2H$) or carboxyoxy group ($-OCO_2H$), and "$Y^2$" represents carboxylate group ($-CO_2^-$) or carboxylate oxy group ($-OCO_2^-$), and

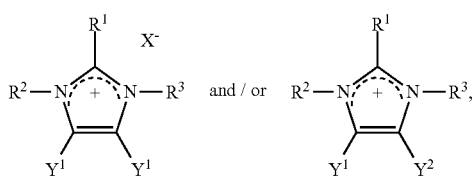

(3)

where "$R^1$," "$R^2$," and "$R^3$" independently represent an alkyl group having a carbon number of 1 to 3, "X" represents a counterpart anion, "$Y^1$" represents carboxyl group ($-CO_2H$) or carboxyoxy group ($-OCO_2H$), and "$Y^2$" represents carboxylate group ($-CO_2^-$) or carboxylate oxy group ($-OCO_2^-$), wherein the first imidazolium salt (B1) and the second imidazolium salt (B2) are totally included at an amount of 10 mole % or less in a total molar number of the electrolyte salt (A), the first imidazolium salt (B1) and the second imidazolium salt (B2).

3. An electrolytic solution according to claim 1, further comprising a non-aqueous solvent.

4. An electrolytic solution according to claim 1, further comprising at least one non-aqueous solvent selected from the group consisting of propylene carbonate, ethylene carbonate, butylene carbonate, sulforan, methyl sulforan, acetonitrile, γ-butyrolactone, dimethyl carbonate, ethyl methyl carbonate and diethyl carbonate.

5. An electrochemical capacitor comprising a polarizable electrode impregnated with the electrolytic solution according to claim 1.

6. An electrical double layer capacitor comprising the electrolytic solution according to claim 1.

7. An electrolytic solution, comprising:
an electrolyte salt (A) made of 1-ethyl-2,3-dimethyl imidazolium tetrafluoroborate;
a first imidazolium salt (B1) as represented by the formula (2); and
a second imidazolium salt (B2) as represented by the formula (3),

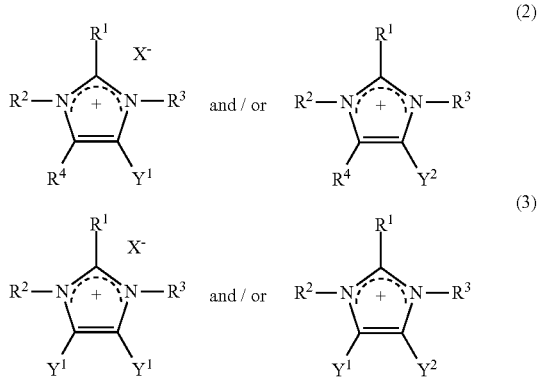

where "$R^1$," "$R^2$," and "$R^3$" independently represent an alkyl group having a carbon number of 1 to 3, "$R^4$" and "$R^5$" independently represent hydrogen atom or an alkyl group having a carbon number of 1 to 3, "$X^-$" represents a counterpart anion, "$Y^1$" represents carboxyl group ($-CO_2H$) or carboxyoxy group ($-OCO_2H$), and "$Y^2$" represents carboxylate group ($-CO_2^-$) or carboxylate oxy group ($-OCO_2^-$), wherein the total amount of the first imidazolium salt (B1) and the second imidazolium salt (B2) is 0.05 to 2 mole % in a total molar number of the electrolyte salt (A), the first imidazolium salt (B1) and the second imidazolium salt (B2).

8. An electrolytic solution according to claim 7, wherein in the formula (1), "$R^1$," "$R^2$," and "$R^3$" independently represent methyl group or ethyl group, and "$R^4$" and "$R^5$" independently represent hydrogen atom, methyl group or ethyl group.

9. An electrolytic solution according to claim 7, wherein in the formula (1), "$R^1$" represents methyl group.

10. An electrolytic solution according to claim 7, further comprising at least one non-aqueous solvent selected from the group consisting of propylene carbonate, ethylene carbonate, butylene carbonate, sulforan, methyl sulforan, acetonitrile, γ-butyrolactone, dimethyl carbonate, ethyl methyl carbonate and diethyl carbonate.

11. An electrochemical capacitor comprising a polarizable electrode impregnated with the electrolytic solution according to claim 7.

12. An electrical double layer capacitor comprising the electrolytic solution according to claim 7.

13. An electrolytic solution according to claim 2, wherein the total amount of the first imidazolium salt (B1) and the second imidazolium salt (B2) is 0.05 to 2 mole %.

* * * * *

UNITED STATES PATENT AND TRADEMARK OFFICE
CERTIFICATE OF CORRECTION

PATENT NO. : 7,858,242 B2
APPLICATION NO. : 11/340679
DATED : December 28, 2010
INVENTOR(S) : Koji Fujioka et al.

Page 1 of 1

It is certified that error appears in the above-identified patent and that said Letters Patent is hereby corrected as shown below:

On the Title Page:
Insert

Item --(63) Continuation of application No. 10/887,359, filed on July 9, 2004--

Signed and Sealed this
Fifth Day of June, 2012

David J. Kappos
*Director of the United States Patent and Trademark Office*